(12) United States Patent
Mizunuma et al.

(10) Patent No.: US 11,528,073 B2
(45) Date of Patent: Dec. 13, 2022

(54) COMMUNICATION TERMINAL AND COMMUNICATION SYSTEM

(71) Applicant: Murata Manufacturing Co., Ltd., Kyoto (JP)

(72) Inventors: Ryuken Mizunuma, Kyoto (JP); Satoshi Tanaka, Kyoto (JP); Yasuhisa Yamamoto, Kyoto (JP); Akiko Itabashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 189 days.

(21) Appl. No.: 17/009,853

(22) Filed: Sep. 2, 2020

(65) Prior Publication Data
US 2021/0075495 A1  Mar. 11, 2021

(30) Foreign Application Priority Data

Sep. 9, 2019 (JP) .............................. JP2019-163990

(51) Int. Cl.
*H04B 7/15* (2006.01)
*H04W 4/80* (2018.01)
*H04B 17/318* (2015.01)

(52) U.S. Cl.
CPC ............ *H04B 7/15* (2013.01); *H04B 17/318* (2015.01); *H04W 4/80* (2018.02)

(58) Field of Classification Search
CPC ......... H04W 4/80; H04B 17/23; H04B 17/26; H04B 17/27; H04B 17/345; H04B 7/15528; H04B 7/15; H04B 17/318
See application file for complete search history.

(56) References Cited

U.S. PATENT DOCUMENTS

| | | | | |
|---|---|---|---|---|
| 2012/0135677 | A1* | 5/2012 | Hsu | H04W 76/30 455/11.1 |
| 2014/0254469 | A1* | 9/2014 | Stephens | H04B 7/0617 370/315 |
| 2015/0023371 | A1* | 1/2015 | Yasuie | H04L 43/0829 370/470 |
| 2017/0033858 | A1* | 2/2017 | Calcev | H04B 7/14 |
| 2017/0142540 | A1* | 5/2017 | Shirakata | H04B 7/0617 |
| 2017/0156066 | A1* | 6/2017 | Shiotani | H04W 48/20 |
| 2017/0332259 | A1* | 11/2017 | Hirayama | H04W 24/04 |
| 2019/0007997 | A1* | 1/2019 | Shiotani | H04B 7/0617 |

(Continued)

FOREIGN PATENT DOCUMENTS

JP    2015023328 A    2/2015

OTHER PUBLICATIONS

"Experimental Demonstration of MmWave Vehicle-to-vehicle Communications Using IEEE 802.11ad"; Kim; Sensors (19)(9); 2019 (Year: 2019).*

(Continued)

*Primary Examiner* — Benjamin H Elliott, IV
(74) *Attorney, Agent, or Firm* — Pearne & Gordon LLP

(57) ABSTRACT

A communication terminal capable of at least millimeter-wave communication and microwave communication is provided. The communication terminal includes a repeater that relays communication between a first communication terminal and a second communication terminal by using millimeter-wave communication. Such a communication terminal is capable of maintaining good millimeter-wave communication between terminals.

8 Claims, 7 Drawing Sheets

(56) References Cited

U.S. PATENT DOCUMENTS

2019/0155769 A1* 5/2019 Levy .................... G06F 13/38
2019/0173582 A1* 6/2019 Ashrafi ............... H01Q 25/005
2021/0075495 A1* 3/2021 Mizunuma ............. H04W 4/80

OTHER PUBLICATIONS

"Fuzzy Logic based Relay Selection for MmWave Communications"; Abdel-Raouf et al.; 2019 9th Annual Information Technology, Electromechanical Engineering and Microelectronics Conference (IEMECON); 2019 (Year: 2019).*

* cited by examiner

COMMUNICATION TERMINAL AND COMMUNICATION SYSTEM

This application claims priority from Japanese Patent Application No. 2019-163990 filed on Sep. 9, 2019. The content of this application is incorporated herein by reference in its entirety.

BACKGROUND OF THE DISCLOSURE

Field of the Disclosure

The present disclosure relates to a communication terminal and a communication system.

Description of the Related Art

In recent years, with the proliferation of mobile information communication terminals, such as smartphones and tablet PCs, the use of the augmented reality (AR) function that displays in a superimposed manner real image information and virtual information associated with the image information on, for example, a head mounted display (HMD) to augment real perceptual experience is increasing. As a communication terminal for realizing such an AR function (hereinafter, also referred to as AR terminal), for example, a glasses-type communication device is described (see, for example, Japanese Unexamined Patent Application Publication No. 2015-233228) other than the above-described HMD.

To realize the AR function, a huge amount of information, such as dynamic image information, is frequently transmitted or received between terminals. For this reason, it is sought to use millimeter-wave communication, such as WiGig (registered trademark), that enables high-speed, large-capacity, low-delay communication.

Since millimeter-wave communication suffers high propagation loss and narrow directivity, when, for example, mobile information communication terminals are put in bags or cases, the received signal strengths are decreased to cause such a problem that millimeter-wave communication may not be established between terminals or good communication conditions may not be maintained because of a decrease in communication speed, or the like.

BRIEF SUMMARY OF THE DISCLOSURE

Accordingly, it is an object of the present disclosure to provide a communication terminal and a communication system that are capable of maintaining good millimeter-wave communication between terminals.

According to preferred embodiments of the present disclosure, a communication terminal is capable of at least millimeter-wave communication and microwave communication, and includes a repeater that relays communication between a first communication terminal and a second communication terminal by using millimeter-wave communication.

With this configuration, it is possible to obtain a communication terminal that is capable of maintaining good millimeter-wave communication between the first communication terminal and the second communication terminal.

According to preferred embodiments of the present disclosure, a communication system includes a first communication terminal, a second communication terminal that performs at least millimeter-wave communication with the first communication terminal, and a third communication terminal that relays millimeter-wave communication between the first communication terminal and the second communication terminal.

With this configuration, it is possible to maintain good millimeter-wave communication between the first communication terminal and the second communication terminal.

Other features, elements, characteristics and advantages of the present disclosure will become more apparent from the following detailed description of preferred embodiments of the present disclosure with reference to the attached drawings.

DETAILED DESCRIPTION OF THE DISCLOSURE

Hereinafter, communication terminals and communication systems according to embodiments will be described in detail with reference to the accompanying drawings. The present disclosure is not limited to the embodiments. The embodiments are illustrative, and, of course, partial replacements or combinations of components described in different embodiments are possible.

First Embodiment

Figure 1:
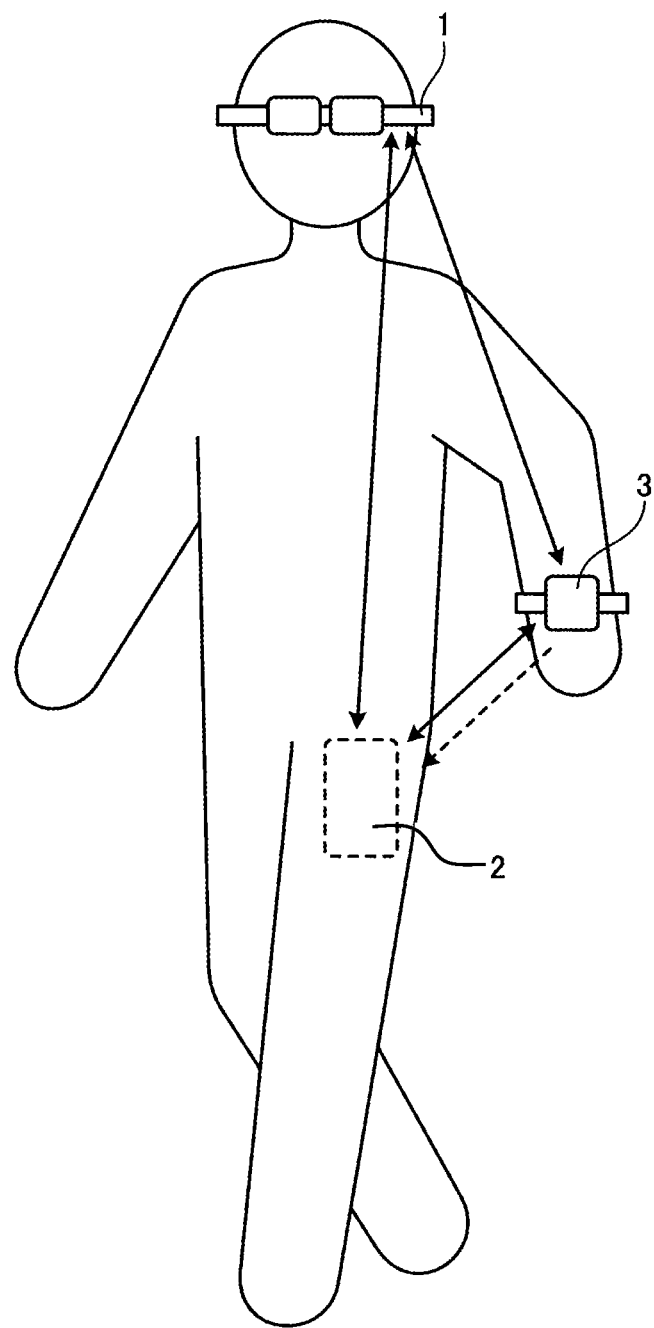
FIG. 1 is a schematic diagram showing the schematic configuration of communication terminals and a communication system according to a first embodiment.

FIG. 1 is a schematic diagram showing the schematic configuration of the communication terminals and the communication system according to a first embodiment. As shown in FIG. 1, the communication system according to the present embodiment includes a first communication terminal 1, a second communication terminal 2, and a third communication terminal 3.

The continuous arrows shown in FIG. 1 represent millimeter-wave communication paths in 60 GHz band of, for example, WiGig (Wireless Gigabit: registered trademark) or the like. The dashed line arrow shown in FIG. 1 represents a microwave communication path in 2.4 GHz band of, for example, Wi-Fi (registered trademark), Bluetooth (registered trademark), or the like. The direction indicated by the dashed line arrow shown in FIG. 1 indicates the direction of transmission of a first received signal strength SGST1 (described later) in the present disclosure. A microwave communication path and its direction of transmission are not limited thereto. Microwave communication may be used to communicate between any two of the first communication terminal 1, the second communication terminal 2, and the third communication terminal 3. Communication may use, in addition to the above-described frequency bands, Ka band (26 GHz to 40 GHz), V band (40 GHz to 75 GHz), and W band (75 GHz to 111 GHz) that are defined by IEEE as millimeter waves.

The second communication terminal 2 is, for example, a mobile information communication terminal, such as a smartphone and a tablet PC. FIG. 1 shows an example in which the second communication terminal 2 is put in a pocket, a bag, or the like of a user.

The second communication terminal 2 performs millimeter-wave communication with the first communication terminal 1 and the third communication terminal 3. The second communication terminal 2 receives at least microwave communication from the third communication terminal 3.

In the present disclosure, the second communication terminal 2 has a function to issue a request to the first communication terminal 1 to measure a communication quality indicator of millimeter-wave communication with the host terminal. Examples of the communication quality indicator include received signal strength indicator (RSSI), user throughput, the number of connected terminals, packet retransmission rate, and modulation rate. In the present disclosure, an example in which RSSI is used as the communication quality indicator will be described. Specifically, the second communication terminal 2 transmits a communication quality request signal CQREQ2 to the first communication terminal 1.

In the present disclosure, the second communication terminal 2 has a function to issue a request to the third communication terminal 3 to measure the RSSI of millimeter-wave communication with the host terminal. Specifically, the second communication terminal 2 transmits a communication quality request signal CQREQ3 to the third communication terminal 3.

The third communication terminal 3 performs at least microwave communication and millimeter-wave communication with the second communication terminal 2 and performs at least millimeter-wave communication with the first communication terminal 1.

In the present disclosure, the third communication terminal 3 includes a repeater that relays millimeter-wave communication between the second communication terminal 2 and the first communication terminal 1. Specifically, the third communication terminal 3 performs a relay operation using the repeater in response to a repeater operation request signal REPREQ from the second communication terminal 2. The repeater has a function to (1) receive first information and then transmit the first information as-is, and (2) receive first information, add second information to the received first information, and then transmit the first information and the second information. The repeater also has a function to change frequency and change modulation.

In the present disclosure, the third communication terminal 3 has a function to issue a request to the first communication terminal 1 to measure the RSSI of millimeter-wave communication with the host terminal. Specifically, the third communication terminal 3 transmits a communication quality request signal CQREQ1 to the first communication terminal 1.

The third communication terminal 3 transmits a third received signal strength SGST3 for a communication quality request signal CQREQ3 from the second communication terminal 2. The third received signal strength SGST3 is the communication quality indicator of millimeter-wave communication from the second communication terminal 2.

The third communication terminal 3 has a function to receive a first received signal strength SGST1 transmitted from the first communication terminal 1 in response to the communication quality request signal CQREQ1 transmitted from the host terminal to the first communication terminal 1 and transfer the first received signal strength SGST1 to the second communication terminal 2 by using microwave communication.

The first communication terminal 1 is an augmented reality (AR) terminal that realizes, for example, an AR function by millimeter-wave communication directly with the second communication terminal 2 or millimeter-wave communication via the third communication terminal 3 by using the repeater of the third communication terminal 3.

The first communication terminal 1 transmits the first received signal strength SGST1 for the communication quality request signal CQREQ1 from the third communication terminal 3. The first received signal strength SGST1 is the communication quality indicator of millimeter-wave communication from the third communication terminal 3.

The first communication terminal 1 transmits a second received signal strength SGST2 for a communication quality request signal CQREQ2 from the second communication terminal 2. The second received signal strength SGST2 is the communication quality indicator of millimeter-wave communication from the second communication terminal 2.

Figure 2A:
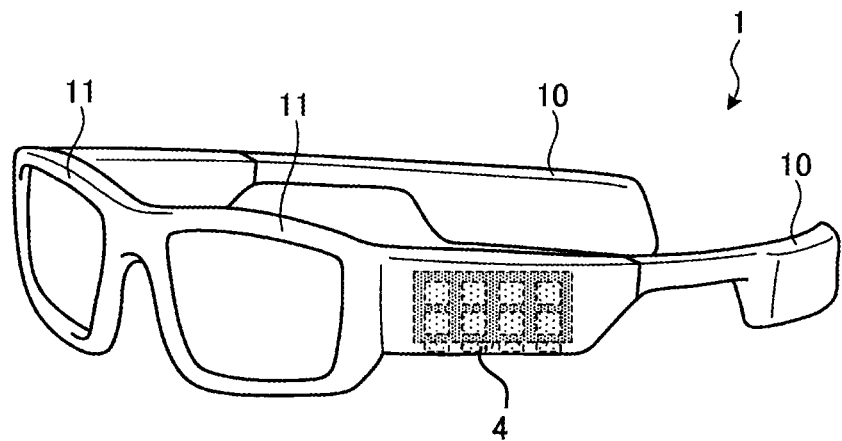
FIG. 2A is a view showing a first example of a first communication terminal.
Figure 2B:
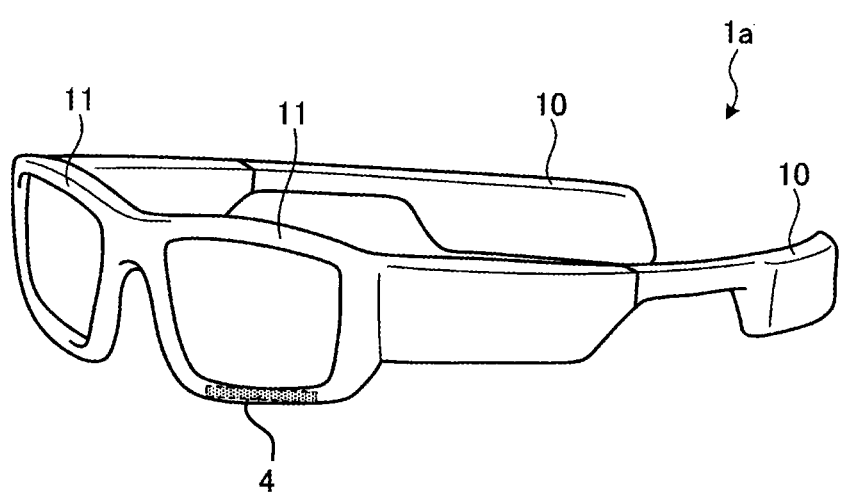
FIG. 2B is a view showing a second example of the first communication terminal.

FIG. 2A is a view showing a first example of the first communication terminal. FIG. 2B is a view showing a second example of the first communication terminal. FIG. 2A and FIG. 2B illustrate glasses-type AR terminals as the first communication terminals 1, 1a.

FIG. 2A shows an example in which a millimeter-wave communication antenna 4 for performing millimeter-wave communication with the second communication terminal 2 is provided in a temple 10. FIG. 2B shows an example in which the millimeter-wave communication antenna 4 is provided in a frame 11.

The first communication terminal 1 is not limited to a glasses-type AR terminal and may be, for example, a head mounted display (HMD). The mode of the first communication terminal 1 does not limit the present disclosure.

Figure 3A:
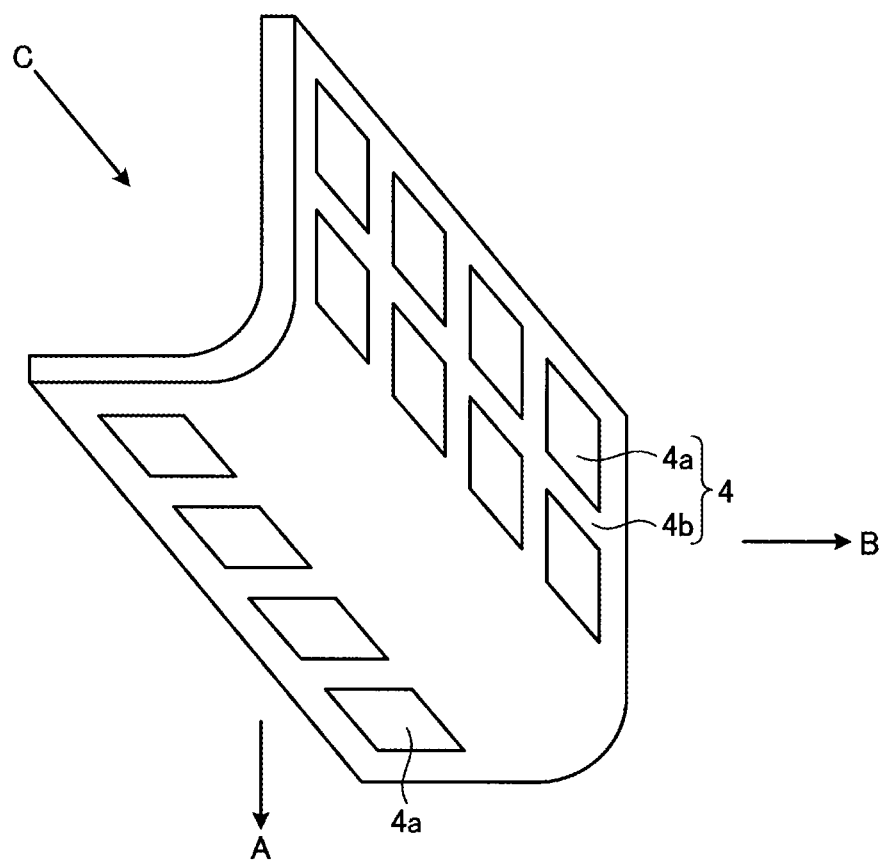
FIG. 3A is a view showing an example of a millimeter-wave communication antenna.
Figure 3B:
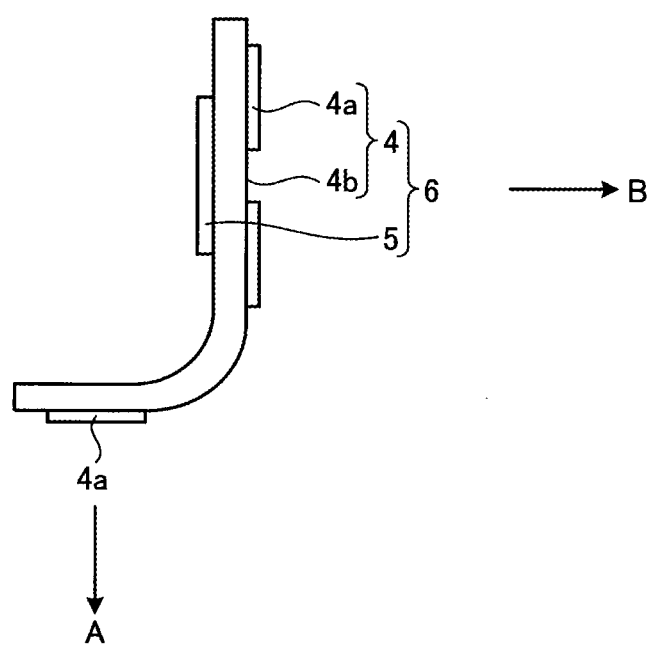
FIG. 3B is a view showing the millimeter-wave communication antenna shown in FIG. 3A when viewed in the direction of an arrow C.

FIG. 3A is a view showing an example of the millimeter-wave communication antenna. FIG. 3B is a view showing the millimeter-wave communication antenna shown in FIG. 3A when viewed in the direction of an arrow C.

As shown in FIG. 3A, in the present embodiment, the millimeter-wave communication antenna 4 is an array antenna in which multiple patch antennas 4a are arranged on the surface of a flexible substrate 4b. The patch antennas 4a are flexible radiation conductors provided on the surface of the flexible substrate 4b and bendable into a desired shape. As shown in FIG. 3B, the millimeter-wave communication antenna 4 according to the present embodiment is bent into a substantially L-shape when viewed in the direction of the arrow C in FIG. 3A. FIG. 3A and FIG. 3B show an example in which a radiation surface of millimeter-wave communication is oriented in two directions, that is, a direction A and a direction B.

As shown in FIG. 3B, the millimeter-wave communication antenna 4 may be in a mode in which an RFIC 5 is provided on the back surface of the flexible substrate 4b, that is, a surface on an opposite side from a surface on which the patch antennas 4a are provided and an RF module 6 is made.

As shown in FIG. 2A and FIG. 2B, when the first communication terminal 1 is a glasses-type AR terminal, the first communication terminal 1 is often used at a level higher than the second communication terminal 2 as shown in FIG. 1.

In such a case, it is desirable that, in a state where a user wears the first communication terminal 1 as shown in FIG. 1, the first communication terminal 1 be disposed such that at least one (for example, the radiation surface oriented in the direction B shown in FIG. 3A and FIG. 3B) of the radiation surfaces is oriented downward, for example, as shown in FIG. 2A.

FIG. 3A and FIG. 3B show an example in which the number of arrays of the patch antennas 4a provided on the radiation surface oriented in the direction A is 2×4 and the number of arrays of the patch antennas 4a provided on the radiation surface oriented in the direction B is 1×4; however, the number of arrays of the patch antennas 4a is not limited thereto. The number of arrays of the patch antennas 4a provided on the radiation surface oriented in the direction B may be, for example, 2×4. The number of arrays of the patch antennas 4a does not limit the present disclosure.

The mode of the millimeter-wave communication antenna 4 is not limited thereto and may be, for example, a mode in which multiple patch antennas 4a are arranged on the surface of a dielectric substrate. In this case, examples of the dielectric substrate that makes up the millimeter-wave communication antenna 4 include low temperature cofired ceramics multilayer substrate (LTCC multilayer substrate), a multilayer resin substrate formed by laminating multiple resin layers made of resin, such as epoxy and polyimide, a multilayer resin substrate formed by laminating multiple resin layers made of a liquid crystal polymer (LCP) having a lower dielectric constant, a multilayer resin substrate formed by laminating multiple resin layers made of a fluorine-based resin, and a ceramic multilayer substrate (except a low temperature cofired ceramics multilayer substrate).

Figure 4A:
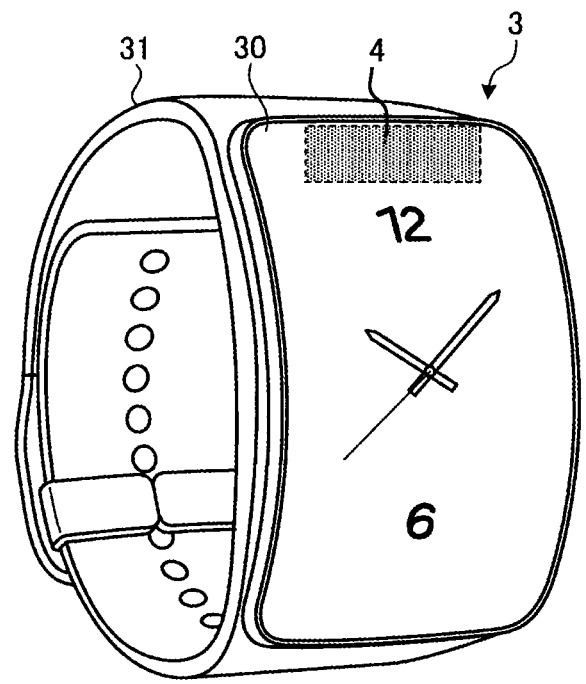
FIG. 4A is a view showing a first example of a third communication terminal.
Figure 4B:
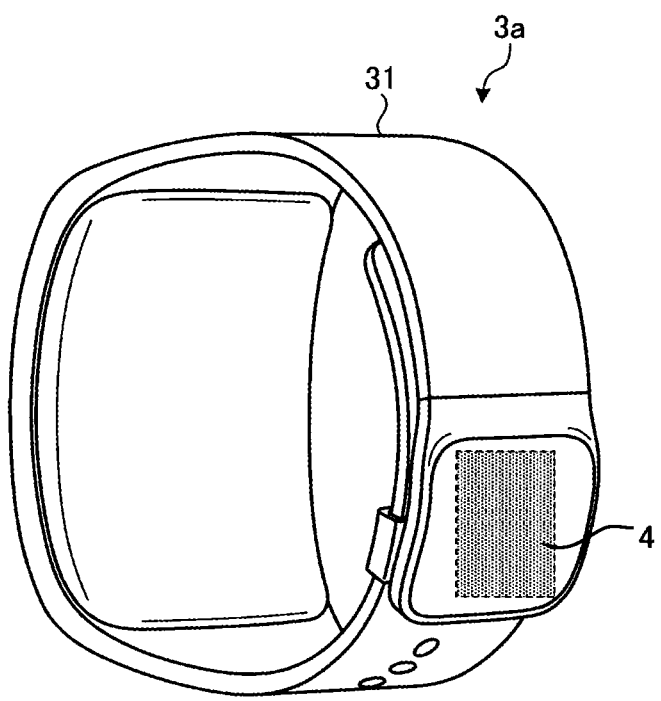
FIG. 4B is a view showing a second example of the third communication terminal.

FIG. 4A is a view showing a first example of the third communication terminal. FIG. 4B is a view showing a second example of the third communication terminal. FIG. 4A and FIG. 4B illustrate watch-type wearable terminals as the third communication terminals 3, 3a.

FIG. 4A shows an example in which the millimeter-wave communication antenna 4 for performing millimeter-wave communication with the second communication terminal 2 is provided in a body case 30. FIG. 4B shows an example in which the millimeter-wave communication antenna 4 is provided in a buckle of a belt 31.

When the third communication terminal 3 is a watch-type wearable terminal, the position and orientation of the millimeter-wave communication antenna 4 are not limited. The millimeter-wave communication antenna 4 may be arranged in an optimal position and orientation as needed in accordance with an assumed positional relationship with the second communication terminal 2 and the first communication terminal 1. The mode in which the millimeter-wave communication antenna 4 is mounted on the third communication terminal 3 is not limited to the modes shown in FIG. 3A and FIG. 3B and may be, for example, a mode in which the multiple patch antennas 4a are arranged on the surface of the dielectric substrate.

The third communication terminal 3 is not limited to the watch-type wearable terminal and may be, for example, a mobile information communication terminal, such as a smartphone and a tablet PC, as well as the second communication terminal 2. The mode of the third communication terminal 3 does not limit the present disclosure.

Next, the concept of selecting a millimeter-wave communication path in the communication terminals and the communication system according to the first embodiment will be described.

For example, as shown in FIG. 1, in an environment in which the second communication terminal 2 (for example, a smartphone) that performs millimeter-wave communication with the first communication terminal 1 that is an AR terminal is put in a pocket, a bag, or the like of a user and there is no reflector for millimeter-wave communication around, there may be a case where a received signal strength decreases and, as a result, millimeter-wave communication is not established between the first communication terminal 1 and the second communication terminal 2 or a case where a good communication condition is not maintained because of a decrease in communication speed, or the like.

In the present disclosure, the third communication terminal 3 that is, for example, a watch-type wearable terminal includes a repeater that relays millimeter-wave communication between the second communication terminal 2 that is, for example, a mobile information communication terminal, such as a smartphone and a tablet PC, and the first communication terminal 1 that is, for example, a glasses-type AR terminal. Thus, when the communication quality of millimeter-wave communication between the second communication terminal 2 and the first communication terminal 1 has decreased, the repeater of the third communication terminal 3 relays millimeter-wave communication between the second communication terminal 2 and the first communication terminal 1. Thus, good millimeter-wave communication is maintained between the first communication terminal 1 and the second communication terminal 2.

Hereinafter, specific operations of the terminals in selecting a millimeter-wave communication path in the communication terminals and the communication system according to the first embodiment will be described with reference to FIG. 5 and FIG. 6.

Figure 5:
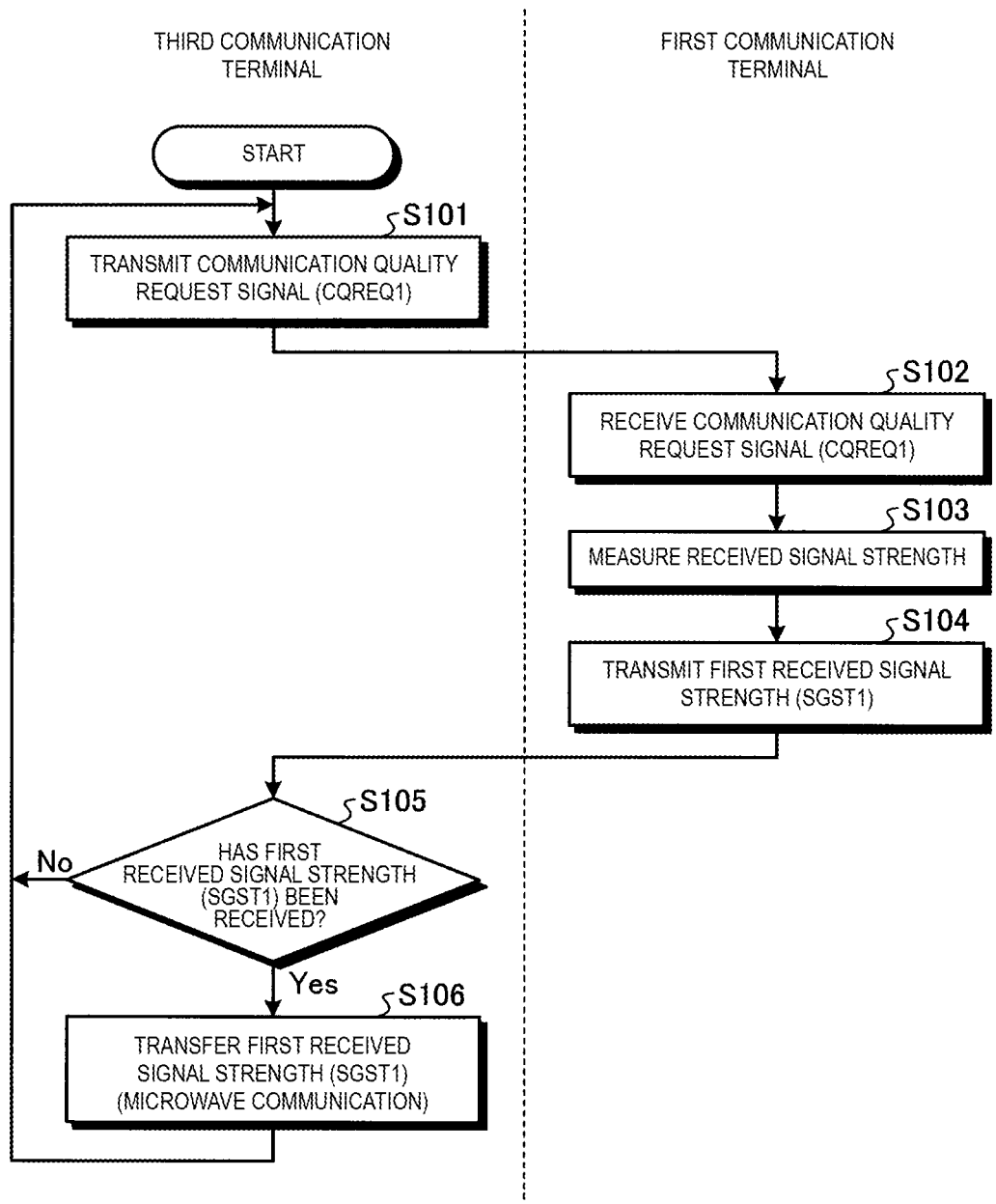
FIG. 5 is a flowchart for acquiring a received signal strength in millimeter-wave communication of the communication terminal according to the first embodiment.
Figure 6:
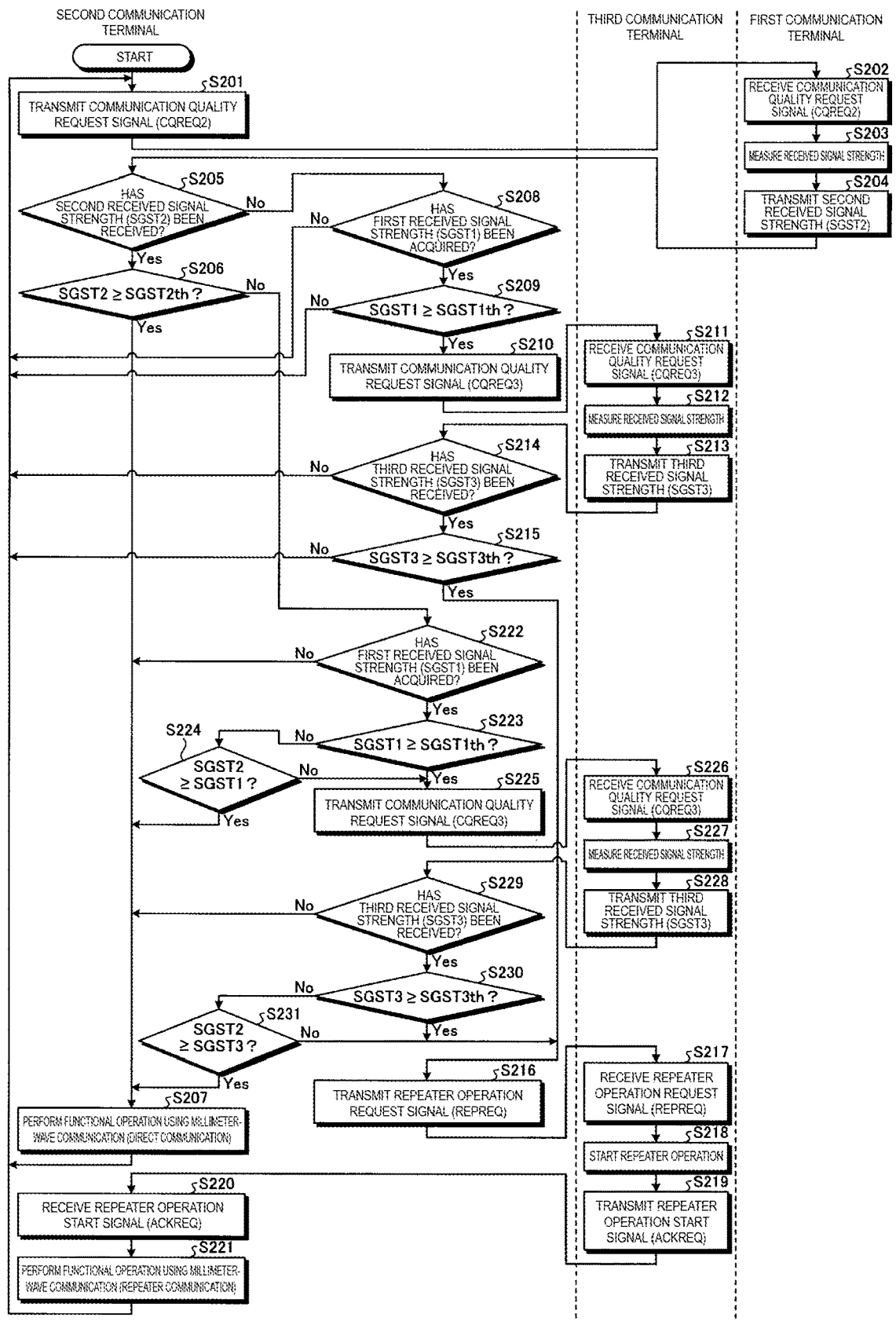
FIG. 6 is a flowchart for selecting a millimeter-wave communication path in the communication system according to the first embodiment.

FIG. 5 is a flowchart for acquiring a received signal strength in millimeter-wave communication of the communication terminals according to the first embodiment. FIG. 6 is a flowchart for selecting a millimeter-wave communication path in the communication system according to the first embodiment.

In the present embodiment, when the second received signal strength SGST2 of millimeter-wave communication from the second communication terminal 2 to the first communication terminal 1 is higher than or equal to a predetermined value, a functional operation (for example, AR functional operation) using direct millimeter-wave communication is performed between the second communication terminal 2 and the first communication terminal 1, and, when the second received signal strength SGST2 is lower than the predetermined value and both the first received signal strength SGST1 of millimeter-wave communication from the third communication terminal 3 to the first communication terminal 1 and the third received signal strength SGST3 of millimeter-wave communication from the second communication terminal 2 to the third communication terminal 3 are higher than or equal to the predetermined value, the functional operation (for example, AR functional operation) using millimeter-wave communication is performed between the second communication terminal 2 and the first communication terminal 1 by using the repeater of the third communication terminal 3.

First, an operation that the third communication terminal 3 acquires the received signal strength of millimeter-wave communication from the third communication terminal 3 to the first communication terminal 1 will be described with reference to FIG. 5.

The third communication terminal 3 transmits the communication quality request signal CQREQ1 to the first communication terminal 1 for millimeter-wave communication from the host terminal (step S101).

When the first communication terminal 1 receives the communication quality request signal CQREQ1 from the third communication terminal 3 (step S102), the first communication terminal 1 measures the received signal strength of millimeter-wave communication from the third communication terminal 3 (step S103). The first communication terminal 1 transmits the measured received signal strength to the third communication terminal 3 as the first received signal strength SGST1 (step S104).

The third communication terminal 3 determines whether millimeter-wave communication is established with the first communication terminal 1. More specifically, the third communication terminal 3 determines whether the third communication terminal 3 has received the first received signal strength SGST1 from the first communication terminal 1 in a predetermined period from transmission (step S101) of the communication quality request signal CQREQ1 (step S105). When the third communication terminal 3 has not received the first received signal strength SGST1 in the predetermined period from transmission (step S101) of the communication quality request signal CQREQ1 (No in step S105), the third communication terminal 3 determines that millimeter-wave communication is not established with the first communication terminal 1 and returns to step S101.

When the third communication terminal 3 has received the first received signal strength SGST1 in the predetermined period from transmission (step S101) of the communication quality request signal CQREQ1 (Yes in step S105), the third communication terminal 3 transfers the first received signal strength SGST1 to the second communication terminal 2 by using microwave communication (step S106) and returns to step S101.

Microwave communication has lower propagation loss and wider directivity than millimeter-wave communication. For this reason, the second communication terminal 2 is capable of stably acquiring the first received signal strength SGST1 regardless of the communication quality of millimeter-wave communication between the third communication terminal 3 and the second communication terminal 2.

Next, the operation of the second communication terminal 2 to select a millimeter-wave communication path will be described with reference to FIG. 6. It is assumed that the first received signal strength SGST1 of millimeter-wave communication from the third communication terminal 3 to the first communication terminal 1 is acquired at any time by means of the above-described flowchart of acquiring a received signal strength, shown in FIG. 5.

The second communication terminal 2 transmits the communication quality request signal CQREQ2 to the first communication terminal 1 for millimeter-wave communication from the host terminal (step S201).

When the first communication terminal 1 receives the communication quality request signal CQREQ2 from the second communication terminal 2 (step S202), the first communication terminal 1 measures the received signal strength of millimeter-wave communication from the second communication terminal 2 (step S203). The first communication terminal 1 transmits the measured received signal strength to the second communication terminal 2 as the second received signal strength SGST2 (step S204).

The second communication terminal 2 determines whether millimeter-wave communication is established with the first communication terminal 1. More specifically, the second communication terminal 2 determines whether the second communication terminal 2 has received the second received signal strength SGST2 from the first communication terminal 1 in a predetermined period from transmission (step S201) of the communication quality request signal CQREQ2 (step S205).

When the second communication terminal 2 has received the second received signal strength SGST2 in the predetermined period from transmission (step S201) of the communication quality request signal CQREQ2 (Yes in step S205), the second communication terminal 2 determines whether the second received signal strength SGST2 is higher than or equal to a predetermined second received signal strength threshold SGST2$th$ (SGST2 SGST2$th$) (step S206).

When the second received signal strength SGST2 is higher than or equal to the predetermined second received signal strength threshold SGST2$th$ (Yes in step S206), the second communication terminal 2 determines that good millimeter-wave communication is performed between the second communication terminal 2 and the first communication terminal 1 and performs a functional operation (for example, AR functional operation) using direct millimeter-wave communication with the first communication terminal 1 (step S207), and returns to step S201.

When the second communication terminal 2 has not received the second received signal strength SGST2 in the predetermined period from transmission (step S201) of the communication quality request signal CQREQ2 (No in step S205), the second communication terminal 2 determines whether the second communication terminal 2 has acquired the first received signal strength SGST1 from the third communication terminal 3 (step S208).

When the second communication terminal 2 has not acquired the first received signal strength SGST1 from the third communication terminal 3 (No in step S208), the second communication terminal 2 determines that millimeter-wave communication is not established with the first communication terminal 1 and returns to step S201.

When the second communication terminal 2 has acquired the first received signal strength SGST1 from the third communication terminal 3 (Yes in step S208), the second communication terminal 2 determines whether the first received signal strength SGST1 is higher than or equal to a predetermined first received signal strength threshold SGST1$th$ (SGST1 SGST1$th$) (step S209).

When the first received signal strength SGST1 is higher than or equal to the predetermined first received signal strength threshold SGST1$th$ (Yes in step S209), the second communication terminal 2 transmits the communication quality request signal CQREQ3 to the third communication terminal 3 for millimeter-wave communication from the host terminal (step S210).

When the third communication terminal 3 receives the communication quality request signal CQREQ3 from the second communication terminal 2 (step S211), the third communication terminal 3 measures the received signal strength of millimeter-wave communication from the second communication terminal 2 (step S212). The third communication terminal 3 transmits the measured received signal strength to the second communication terminal 2 as the third received signal strength SGST3 (step S213).

The second communication terminal 2 determines whether millimeter-wave communication is established with the third communication terminal 3. More specifically, the second communication terminal 2 determines whether the second communication terminal 2 has received the third received signal strength SGST3 from the third communication terminal 3 in a predetermined period from transmission (step S210) of the communication quality request signal CQREQ3 (step S214).

When the second communication terminal 2 has not received the third received signal strength SGST3 in the predetermined period from transmission (step S210) of the communication quality request signal CQREQ3 (No in step S214), the second communication terminal 2 determines that millimeter-wave communication is not established with the third communication terminal 3 and returns to step S201.

When the second communication terminal 2 has received the third received signal strength SGST3 in the predetermined period from transmission (step S210) of the communication quality request signal CQREQ3 (Yes in step S214), the second communication terminal 2 determines whether the third received signal strength SGST3 is higher than or equal to a predetermined third received signal strength threshold SGST3th (SGST3 SGST3th) (step S215).

When the third received signal strength SGST3 is lower than the predetermined third received signal strength threshold SGST3th (No in step 215), the second communication terminal 2 determines that millimeter-wave communication is not established with the third communication terminal 3 and returns to step S201.

When the third received signal strength SGST3 is higher than or equal to the third received signal strength threshold SGST3th (Yes in step S215), the second communication terminal 2 determines that good millimeter-wave communication is performed between the second communication terminal 2 and the first communication terminal 1 by using the repeater of the third communication terminal 3 and transmits the repeater operation request signal REPREQ to the third communication terminal 3 (step S216).

When the third communication terminal 3 receives the repeater operation request signal REPREQ (step S217), the third communication terminal 3 starts the operation of the repeater (step S218) and transmits a repeater operation start signal ACKREQ indicating the start of operation of the repeater to the second communication terminal 2 (step S219).

When the second communication terminal 2 receives the repeater operation start signal ACKREQ from the third communication terminal 3 (step S220), the second communication terminal 2 performs a functional operation (for example, AR functional operation) using millimeter-wave communication between the second communication terminal 2 and the first communication terminal 1 by using the repeater of the third communication terminal 3 (step S221) and returns to step S201.

When the second received signal strength SGST2 is lower than the predetermined second received signal strength threshold SGST2th (No in step S206), the second communication terminal 2 determines whether the second communication terminal 2 has acquired the first received signal strength SGST1 from the third communication terminal 3 (step S222).

When the second communication terminal 2 has not acquired the first received signal strength SGST1 from the third communication terminal 3 (No in step S222), the second communication terminal 2 determines that millimeter-wave communication is not established with the first communication terminal 1 and performs a functional operation (for example, AR functional operation) using direct millimeter-wave communication with the first communication terminal 1 (step S207) and returns to step S201.

When the second communication terminal 2 has acquired the first received signal strength SGST1 from the third communication terminal 3 (Yes in step S222), the second communication terminal 2 determines whether the first received signal strength SGST1 is higher than or equal to the predetermined first received signal strength threshold SGST1th (SGST1 SGST1th) (step S223).

When the first received signal strength SGST1 is lower than the predetermined first received signal strength threshold SGST1th (No in step S223), the second communication terminal 2 determines whether the second received signal strength SGST2 is higher than or equal to the first received signal strength SGST1 (SGST2 SGST1) (step S224).

When the second received signal strength SGST2 is higher than or equal to the first received signal strength SGST1 (Yes in step S224), the second communication terminal 2 performs a functional operation (for example, AR functional operation) using direct millimeter-wave communication with the first communication terminal 1 (step S207) and returns to step S201.

When the first received signal strength SGST1 is higher than or equal to the predetermined first received signal strength threshold SGST1th (Yes in step S223) or when the second received signal strength SGST2 is lower than the first received signal strength SGST1 (No in step S224), the second communication terminal 2 transmits the communication quality request signal CQREQ3 to the third communication terminal 3 for millimeter-wave communication from the host terminal (step S225).

When the third communication terminal 3 receives the communication quality request signal CQREQ3 from the second communication terminal 2 (step S226), the third communication terminal 3 measures the received signal strength of millimeter-wave communication from the second communication terminal 2 (step S227). The third communication terminal 3 transmits the measured received signal strength to the second communication terminal 2 as the third received signal strength SGST3 (step S228).

The second communication terminal 2 determines whether millimeter-wave communication is established with the third communication terminal 3. More specifically, the second communication terminal 2 determines whether the second communication terminal 2 has received the third received signal strength SGST3 from the third communication terminal 3 in a predetermined period from transmission (step S225) of the communication quality request signal CQREQ3 (step S229).

When the second communication terminal 2 has not received the third received signal strength SGST3 in the predetermined period from transmission (step S225) of the communication quality request signal CQREQ3 (No in step S229), the second communication terminal 2 performs a functional operation (for example, AR functional operation) using direct millimeter-wave communication with the first communication terminal 1 (step S207) and returns to step S201.

When the second communication terminal 2 has received the third received signal strength SGST3 in the predetermined period from transmission (step S225) of the communication quality request signal CQREQ3 (Yes in step S229), the second communication terminal 2 determines whether the third received signal strength SGST3 is higher than or equal to the predetermined third received signal strength threshold SGST3$th$ (SGST3 SGST3$th$) (step S230).

When the third received signal strength SGST3 is lower than the predetermined third received signal strength threshold SGST3$th$ (No in step 230), the second communication terminal 2 determines whether the second received signal strength SGST2 is higher than or equal to the third received signal strength SGST3 (SGST2 SGST3) (step S231).

When the second received signal strength SGST2 is higher than or equal to the third received signal strength SGST3 (Yes in step S231), the second communication terminal 2 performs a functional operation (for example, AR functional operation) using direct millimeter-wave communication with the first communication terminal 1 (step S207).

When the third received signal strength SGST3 is higher than or equal to the predetermined third received signal strength threshold SGST3$th$ (Yes in step S230) or when the second received signal strength SGST2 is lower than the third received signal strength SGST3 (No in step S231), the second communication terminal 2 transmits the repeater operation request signal REPREQ to the third communication terminal 3 (step S216).

When the third communication terminal 3 receives the repeater operation request signal REPREQ (step S217), the third communication terminal 3 starts the operation of the repeater (step S218) and transmits the repeater operation start signal ACKREQ indicating the start of operation of the repeater to the second communication terminal 2 (step S219).

When the second communication terminal 2 receives the repeater operation start signal ACKREQ from the third communication terminal 3 (step S220), the second communication terminal 2 performs a functional operation (for example, AR functional operation) using millimeter-wave communication between the second communication terminal 2 and the first communication terminal 1 by using the repeater of the third communication terminal 3 (step S221) and returns to step S201.

The first received signal strength threshold SGST1$th$ for the first received signal strength SGST1, the second received signal strength threshold SGST2$th$ for the second received signal strength SGST2, and the third received signal strength threshold SGST3$th$ for the third received signal strength SGST3 may be the same value or may be different values.

With the above-described process, good millimeter-wave communication is maintained between the first communication terminal 1 and the second communication terminal 2.

Second Embodiment

Figure 7:
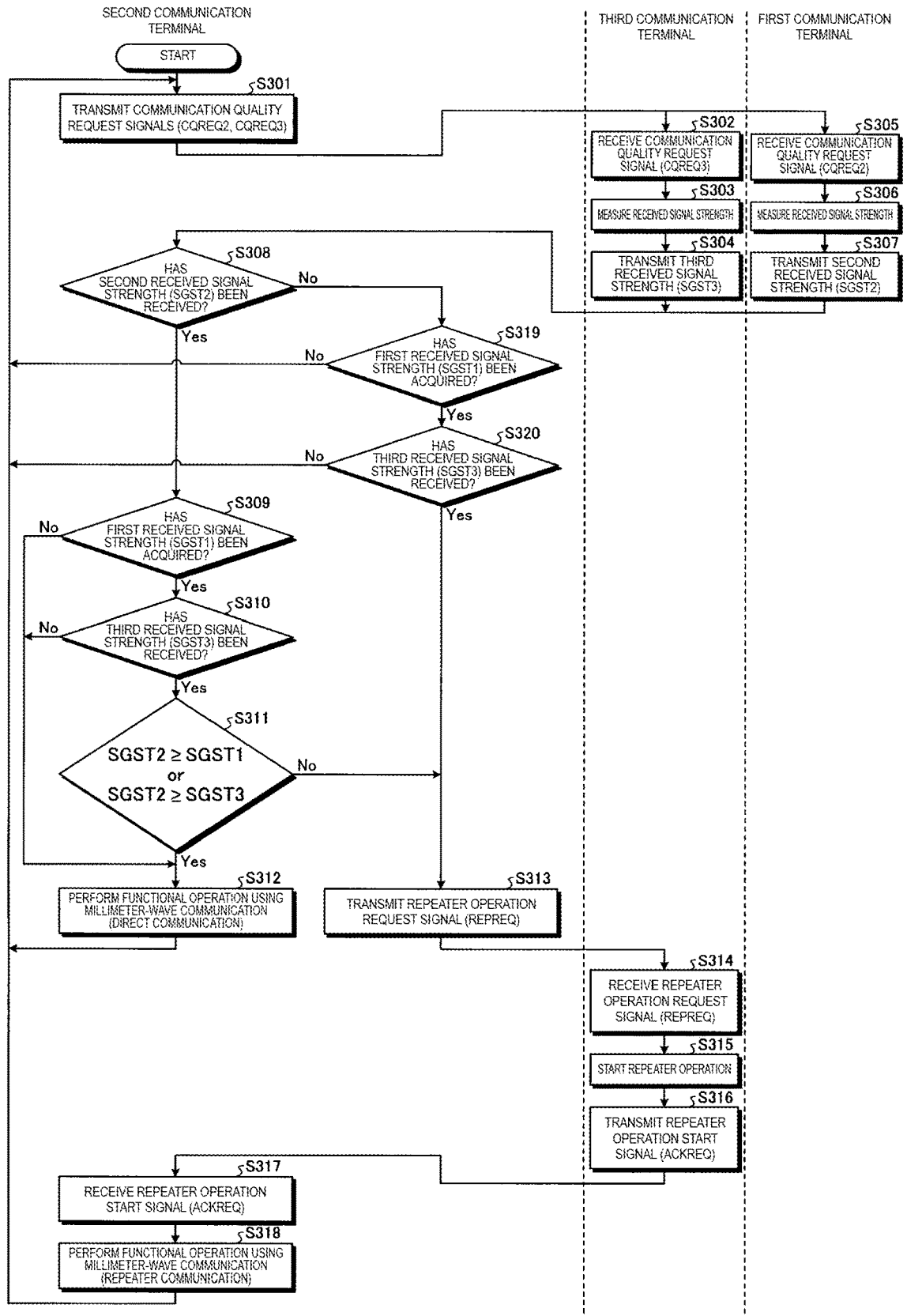
FIG. 7 is a flowchart for selecting a millimeter-wave communication path in a communication system according to a second embodiment.

FIG. 7 is a flowchart for selecting a millimeter-wave communication path in a communication system according to a second embodiment. The schematic configuration of the communication terminals and the communication system, the modes of the communication terminals, the mode of the millimeter-wave communication antenna, and the flowchart for acquiring a received signal strength in millimeter-wave communication of the communication terminals are similar to those of the first embodiment, so the description thereof is omitted.

In the present embodiment, when the second received signal strength SGST2 is higher than or equal to the first received signal strength SGST1 or when the second received signal strength SGST2 is higher than or equal to the third received signal strength SGST3, a functional operation (for example, AR functional operation) is performed using direct millimeter-wave communication between the second communication terminal 2 and the first communication terminal 1, and, when the second received signal strength SGST2 is lower than the first received signal strength SGST1 or when the second received signal strength SGST2 is lower than the third received signal strength SGST3, a functional operation (for example, AR functional operation) is performed using millimeter-wave communication between the second communication terminal 2 and the first communication terminal 1 by using the repeater of the third communication terminal 3.

The second communication terminal 2 transmits the communication quality request signal CQREQ2 to the first communication terminal 1 for millimeter-wave communication from the host terminal and transmits the communication quality request signal CQREQ3 to the third communication terminal 3 for millimeter-wave communication from the host terminal (step S301).

When the third communication terminal 3 receives the communication quality request signal CQREQ3 from the second communication terminal 2 (step S302), the third communication terminal 3 measures the received signal strength of millimeter-wave communication from the second communication terminal 2 (step S303). The third communication terminal 3 transmits the measured received signal strength to the second communication terminal 2 as the third received signal strength SGST3 (step S304).

When the first communication terminal 1 receives the communication quality request signal CQREQ2 from the second communication terminal 2 (step S305), the first communication terminal 1 measures the received signal strength of millimeter-wave communication from the second communication terminal 2 (step S306). The first communication terminal 1 transmits the measured received signal strength to the second communication terminal 2 as the second received signal strength SGST2 (step S307).

The second communication terminal 2 determines whether millimeter-wave communication is established with the first communication terminal 1. More specifically, the second communication terminal 2 determines whether the second communication terminal 2 has received the second received signal strength SGST2 from the first communication terminal 1 in a predetermined period from transmission (step S301) of the communication quality request signal CQREQ2 (step S308).

When the second communication terminal 2 has received the second received signal strength SGST2 in the predetermined period from transmission (step S301) of the communication quality request signal CQREQ2 (Yes in step S308), the second communication terminal 2 determines whether the second communication terminal 2 has acquired the first received signal strength SGST1 from the third communication terminal 3 (step S309).

When the second communication terminal 2 has acquired the first received signal strength SGST1 from the third communication terminal 3 (Yes in step S309), the second communication terminal 2 determines whether millimeter-wave communication is established with the third communication terminal 3. More specifically, the second communication terminal 2 determines whether the second communication terminal 2 has received the third received signal strength SGST3 from the third communication terminal 3 in a predetermined period from transmission (step S301) of the communication quality request signal CQREQ3 (step S310).

When the second communication terminal 2 has received the third received signal strength SGST3 in the predetermined period from transmission (step S301) of the communication quality request signal CQREQ3 (Yes in step S310), the second communication terminal 2 determines whether the second received signal strength SGST2 is higher than or equal to the first received signal strength SGST1 or the third received signal strength SGST3 (SGST2 SGST1 or SGST2 SGST3) (step S311). In other words, the second communication terminal 2 determines whether the second received signal strength SGST2 is higher than or equal to at least one of the first received signal strength SGST1 and the third received signal strength SGST3.

When the second communication terminal 2 has not received the first received signal strength SGST1 from the third communication terminal 3 (No in step S309), when the second communication terminal 2 has not received the third received signal strength SGST3 in the predetermined period from transmission (step S301) of the communication quality request signal CQREQ3 (No in step S310), or when the second received signal strength SGST2 is higher than or equal to at least one of the first received signal strength SGST1 and the third received signal strength SGST3 (Yes in step S311), the second communication terminal 2 performs a functional operation (for example, AR functional operation) using direct millimeter-wave communication with the first communication terminal 1 (step S312) and returns to step S301.

When the second received signal strength SGST2 is lower than the first received signal strength SGST1 and lower than the third received signal strength SGST3 (No in step S311), the second communication terminal 2 transmits the repeater operation request signal REPREQ to the third communication terminal 3 (step S313).

When the third communication terminal 3 receives the repeater operation request signal REPREQ (step S314), the third communication terminal 3 starts the operation of the repeater (step S315) and transmits the repeater operation start signal ACKREQ indicating the start of operation of the repeater to the second communication terminal 2 (step S316).

When the second communication terminal 2 receives the repeater operation start signal ACKREQ from the third communication terminal 3 (step S317), the second communication terminal 2 performs a functional operation (for example, AR functional operation) using millimeter-wave communication between the second communication terminal 2 and the first communication terminal 1 by using the repeater of the third communication terminal 3 (step S318) and returns to step S301.

When the second communication terminal 2 has not received the second received signal strength SGST2 in the predetermined period from transmission (step S301) of the communication quality request signal CQREQ2 (No in step S308), the second communication terminal 2 determines whether the second communication terminal 2 has acquired the first received signal strength SGST1 from the third communication terminal 3 (step S319).

When the second communication terminal 2 has not acquired the first received signal strength SGST1 from the third communication terminal 3 (No in step S319), the second communication terminal 2 determines that millimeter-wave communication is not established with the first communication terminal 1 and returns to step S301.

When the second communication terminal 2 has acquired the first received signal strength SGST1 from the third communication terminal 3 (Yes in step S319), the second communication terminal 2 determines whether millimeter-wave communication is established with the third communication terminal 3. More specifically, the second communication terminal 2 determines whether the second communication terminal 2 has received the third received signal strength SGST3 from the third communication terminal 3 in a predetermined period from transmission (step S301) of the communication quality request signal CQREQ3 (step S320).

When the second communication terminal 2 has not received the third received signal strength SGST3 from the third communication terminal 3 in the predetermined period from transmission (step S301) of the communication quality request signal CQREQ3 (No in step S320), the second communication terminal 2 determines that millimeter-wave communication is not established with the third communication terminal 3 and returns to step S301.

When the second communication terminal 2 has received the third received signal strength SGST3 from the third communication terminal 3 in the predetermined period from transmission (step S301) of the communication quality request signal CQREQ3 (Yes in step S320), the second communication terminal 2 transmits the repeater operation request signal REPREQ to the third communication terminal 3 (step S313).

When the third communication terminal 3 receives the repeater operation request signal REPREQ (step S314), the third communication terminal 3 starts the operation of the repeater (step S315) and transmits the repeater operation start signal ACKREQ indicating the start of operation of the repeater to the second communication terminal 2 (step S316).

When the second communication terminal 2 receives the repeater operation start signal ACKREQ from the third communication terminal 3 (step S317), the second communication terminal 2 performs a functional operation (for example, AR functional operation) using millimeter-wave communication between the second communication terminal 2 and the first communication terminal 1 by using the repeater of the third communication terminal 3 (step S318) and returns to step S301.

With the above-described process, as in the case of the first embodiment, good millimeter-wave communication is maintained between the first communication terminal 1 and the second communication terminal 2.

The embodiments described above are intended to easily understand the present disclosure, and are not intended to limit interpretation of the present disclosure. The present disclosure may be modified or improved without departing from the purport of the disclosure, and the present disclosure also encompasses equivalents thereof. For example, in the above-described embodiments, a millimeter-wave communication antenna in which patch antennas are arranged is described as an example. Alternatively, a millimeter-wave communication antenna may be a dipole antenna or a slot antenna and may be a combination of a dipole antenna and a slot antenna.

The present disclosure may be modified as follows as described above or instead of the above.

(1) According to preferred embodiments of the present disclosure, a communication terminal is capable of at least millimeter-wave communication and microwave communication, and includes a repeater that relays communication between a first communication terminal and a second communication terminal by using millimeter-wave communication.

With this configuration, it is possible to obtain a communication terminal that is capable of maintaining good millimeter-wave communication between the first communication terminal and the second communication terminal.

(2) In the communication terminal described in the above (1), the third communication terminal may acquire a first received signal strength that is a communication quality indicator of millimeter-wave communication with the first communication terminal every predetermined period and transmit the first received signal strength to the second communication terminal by using microwave communication.

(3) In the communication terminal described in the above (2), when both the first received signal strength and a second received signal strength that is a communication quality indicator of millimeter-wave communication with the second communication terminal are higher than or equal to a predetermined value, the repeater may relay communication between the first communication terminal and the second communication terminal by using millimeter-wave communication.

(4) According to preferred embodiments of the present disclosure, a communication system includes a first communication terminal, a second communication terminal that performs at least millimeter-wave communication with the first communication terminal, and a third communication terminal that relays millimeter-wave communication between the first communication terminal and the second communication terminal.

With this configuration, it is possible to maintain good millimeter-wave communication between the first communication terminal and the second communication terminal.

(5) In the communication system described in the above (4), the third communication terminal may acquire a first received signal strength that is a communication quality indicator of millimeter-wave communication with the first communication terminal every predetermined period and transmit the first received signal strength to the second communication terminal by using microwave communication.

(6) In the communication system of the above (5), the second communication terminal may acquire a second received signal strength that is a communication quality indicator of millimeter-wave communication with the first communication terminal every predetermined period, and, when the second received signal strength is higher than or equal to a predetermined value, may perform millimeter-wave communication with the first communication terminal.

(7) In the communication system of the above (6), when the second received signal strength is lower than the predetermined value, the second communication terminal may acquire a third received signal strength that is a communication quality indicator of millimeter-wave communication with the third communication terminal, and, when both the first received signal strength and the third received signal strength are higher than or equal to a predetermined value, may use the third communication terminal as a relay to perform millimeter-wave communication with the first communication terminal.

(8) In the communication system of the above (5), the second communication terminal may acquire a second received signal strength that is a communication quality indicator of millimeter-wave communication with the first communication terminal and a third received signal strength that is a communication quality indicator of millimeter-wave communication with the third communication terminal every predetermined period, when the second received signal strength is higher than or equal to at least one of the first received signal strength and the third received signal strength, may perform millimeter-wave communication with the first communication terminal, and, when the second received signal strength is lower than the first received signal strength and lower than the third received signal strength, may use the third communication terminal as a relay to perform millimeter-wave communication with the first communication terminal.

(9) In the communication system of any one of the above (4) to (8), the first communication terminal may be an AR terminal.

(10) In the communication system of any one of the above (4) to (9), the third communication terminal may be a watch-type wearable terminal.

According to the present disclosure, a communication device that sufficiently takes advantage of the performance of a communication circuit compatible with millimeter-wave communication is obtained.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A third communication terminal configured to perform at least a millimeter-wave communication and a microwave communication, the third communication terminal comprising:

a repeater configured to relay communication between a first communication terminal and a second communication terminal by using the millimeter-wave communication, wherein the third communication terminal is further configured to:

acquire a first received signal strength at every predetermined period, the first received signal strength being a first communication quality indicator of the millimeter-wave communication with the first communication terminal, and transmit the first received signal strength to the second communication terminal by using the microwave communication, wherein:

the second communication terminal is further configured to, every predetermined period, acquire a second received signal strength and to acquire a third received signal strength, the second received signal strength being a second communication quality indicator of the millimeter-wave communication with the first communication terminal, and the third received signal strength being a third communication quality indicator of the millimeter-wave communication with the third communication terminal, when the second received signal strength is greater than or equal to the first received signal strength or the third received signal strength, the second communication terminal is configured to perform the millimeter-wave communication with the first communication terminal, and when the second received signal strength is less than the first received signal strength and less than the third received signal strength, the second communication terminal is configured to use the third communication terminal as a relay to perform the millimeter-wave communication with the first communication terminal.

2. The third communication terminal according to claim 1, wherein:
when both the first received signal strength and the second received signal strength are each greater than or equal to a predetermined value, the repeater is configured to relay communications between the first communication terminal and the second communication terminal by using the millimeter-wave communication.

3. A communication system comprising
a first communication terminal;
a second communication terminal configured to perform a millimeter-wave communication with the first communication terminal; and
a third communication terminal configured to relay the millimeter-wave communication between the first communication terminal and the second communication terminal,
wherein the third communication terminal is further configured to:
acquire a first received signal strength every predetermined period, the first received signal strength being a first communication quality indicator of the millimeter-wave communication with the first communication terminal, and
transmit the first received signal strength to the second communication terminal by using a microwave communication,
wherein:
the second communication terminal is further configured to acquire a second received signal strength every predetermined period, the second receive signal strength being a second communication quality indicator of the millimeter-wave communication with the first communication terminal, and
when the second received signal strength is greater than or equal to a predetermined value, the second communication terminal is configured to perform the millimeter-wave communication with the first communication terminal,
wherein:
when the second received signal strength is less than the predetermined value, the second communication terminal is further configured to acquire a third received signal strength, the third received signal strength being a third communication quality indicator of the millimeter-wave communication with the third communication terminal, and
when both the first received signal strength and the third received signal strength are each greater than or equal to the predetermined value, the second communication terminal is configured to use the third communication terminal as a relay to perform the millimeter-wave communication with the first communication terminal.

4. The communication system according to claim 3, wherein the first communication terminal is an augmented reality (AR) terminal.

5. The communication system according to claim 3, wherein the third communication terminal is a watch-type wearable terminal.

6. A communication system comprising
a first communication terminal;
a second communication terminal configured to perform a millimeter-wave communication with the first communication terminal; and
a third communication terminal configured to relay the millimeter-wave communication between the first communication terminal and the second communication terminal,
wherein the third communication terminal is further configured to:
acquire a first received signal strength every predetermined period, the first received signal strength being a first communication quality indicator of the millimeter-wave communication with the first communication terminal, and
transmit the first received signal strength to the second communication terminal by using a microwave communication,
wherein:
the second communication terminal is further configured to, every predetermined period, acquire a second received signal strength and to acquire a third received signal strength, the second received signal strength being a second communication quality indicator of the millimeter-wave communication with the first communication terminal, and the third received signal strength being a third communication quality indicator of the millimeter-wave communication with the third communication terminal,
when the second received signal strength is greater than or equal to the first received signal strength or the third received signal strength, the second communication terminal is configured to perform the millimeter-wave communication with the first communication terminal, and
when the second received signal strength is less than the first received signal strength and less than the third received signal strength, the second communication terminal is configured to use the third communication terminal as a relay to perform the millimeter-wave communication with the first communication terminal.

7. The communication system according to claim 6, wherein the first communication terminal is an augmented reality (AR) terminal.

8. The communication system according to claim 6, wherein the third communication terminal is a watch-type wearable terminal.

* * * * *